Nov. 8, 1966
J. P. TAMAIN
3,283,360
TENDERIZING MEAT MACHINES
Filed June 16, 1964
5 Sheets-Sheet 1
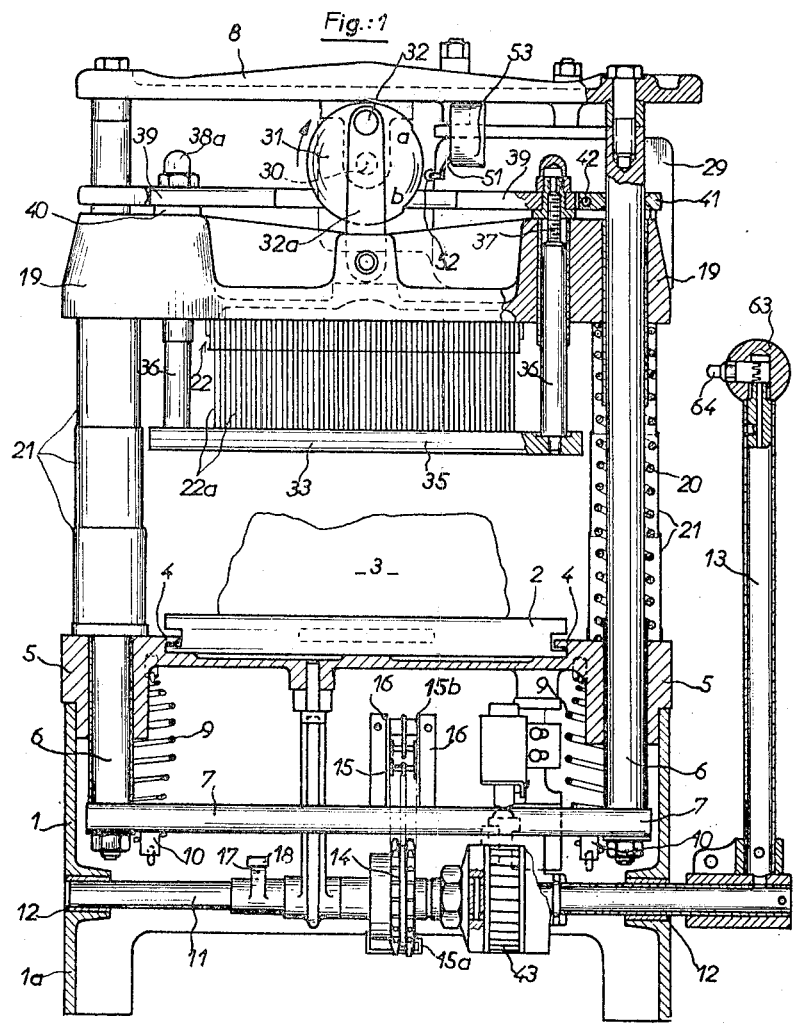
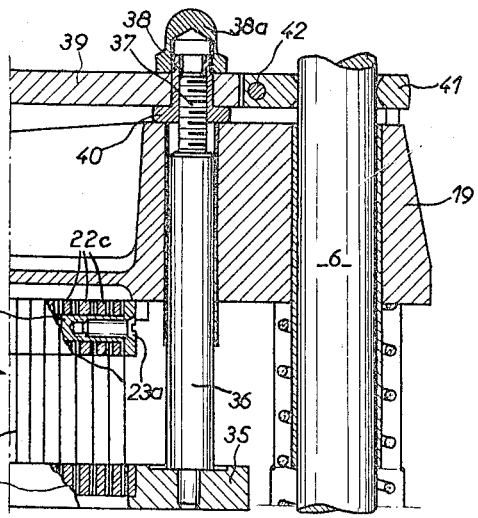

Nov. 8, 1966  J. P. TAMAIN  3,283,360
TENDERIZING MEAT MACHINES
Filed June 16, 1964  5 Sheets-Sheet 2
Fig.:3  Fig.:4
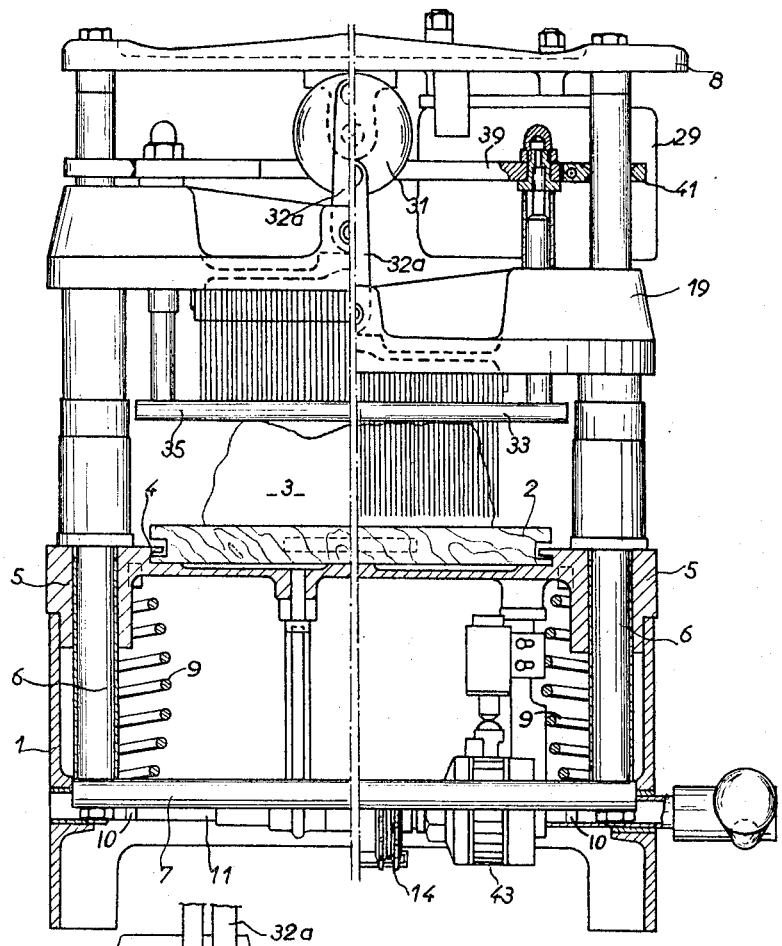
Fig.:7
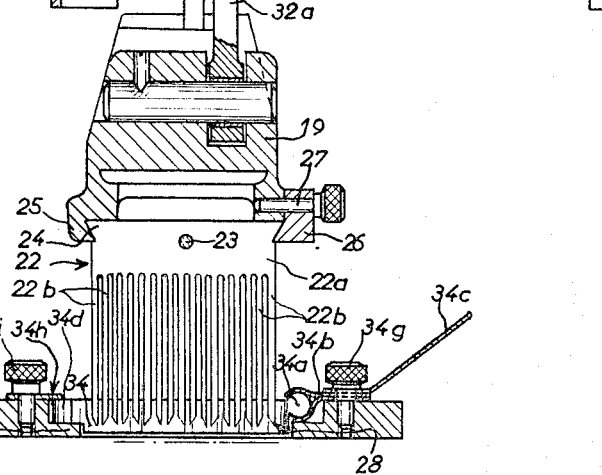

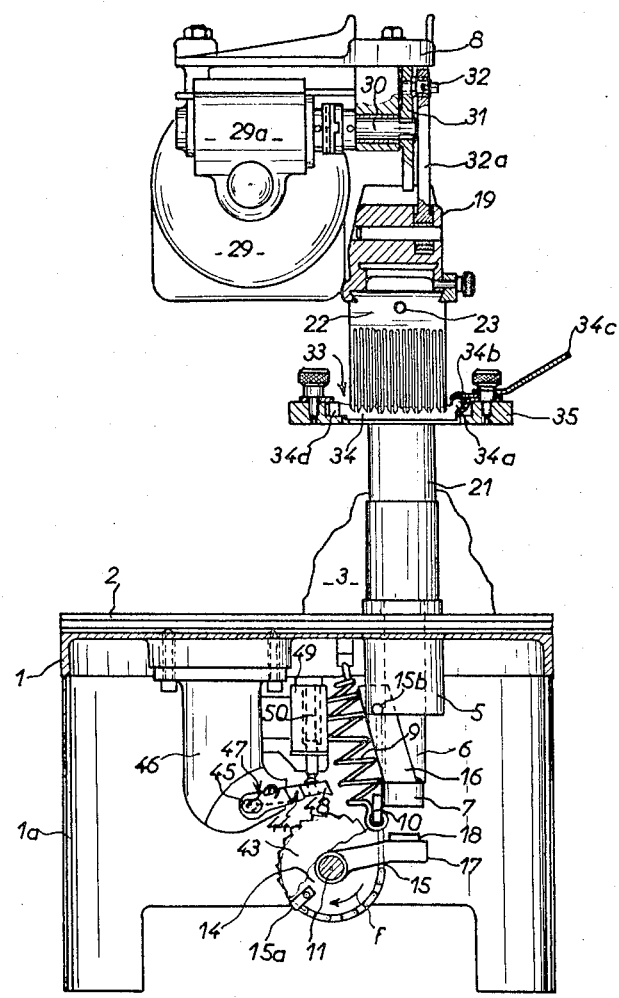
Fig.: 5

Nov. 8, 1966 J. P. TAMAIN 3,283,360
TENDERIZING MEAT MACHINES
Filed June 16, 1964 5 Sheets-Sheet 4
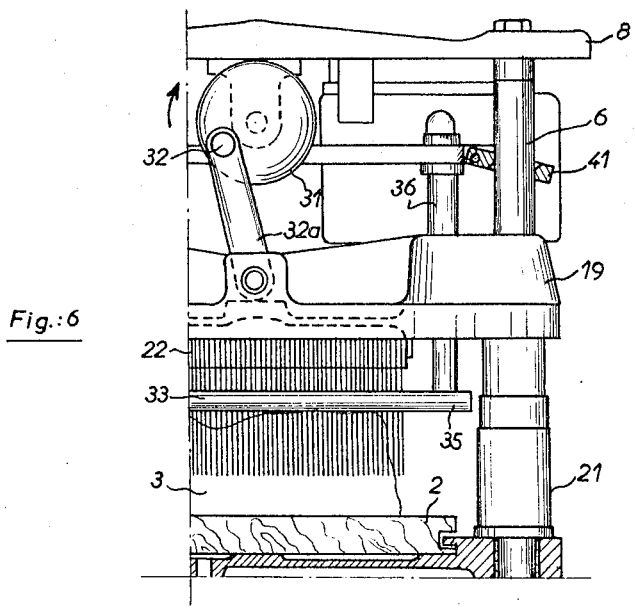
Fig.:6
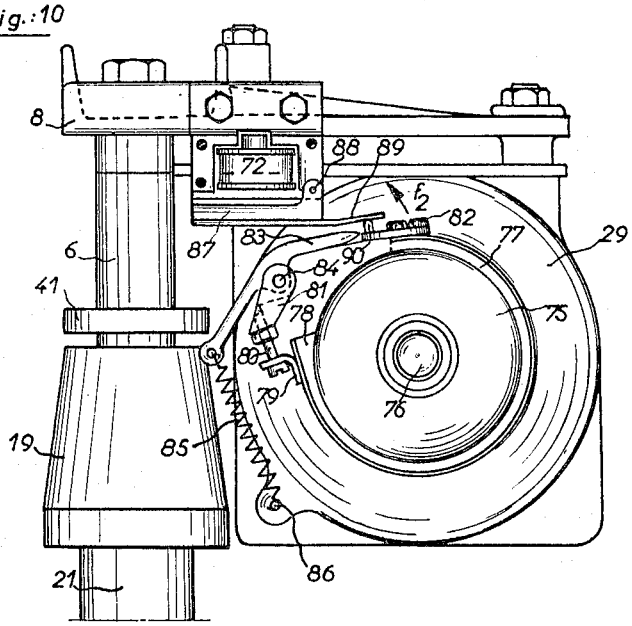
Fig.:10

Nov. 8, 1966   J. P. TAMAIN   3,283,360
TENDERIZING MEAT MACHINES
Filed June 16, 1964   5 Sheets-Sheet 5
Fig.: 8
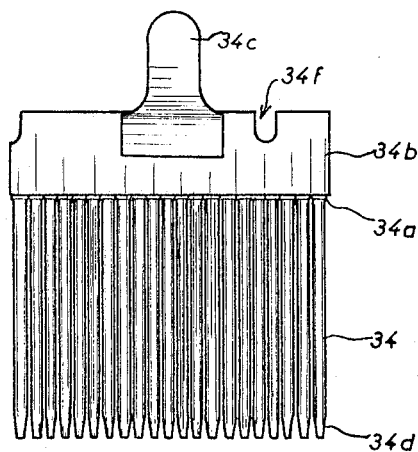
Fig.: 9
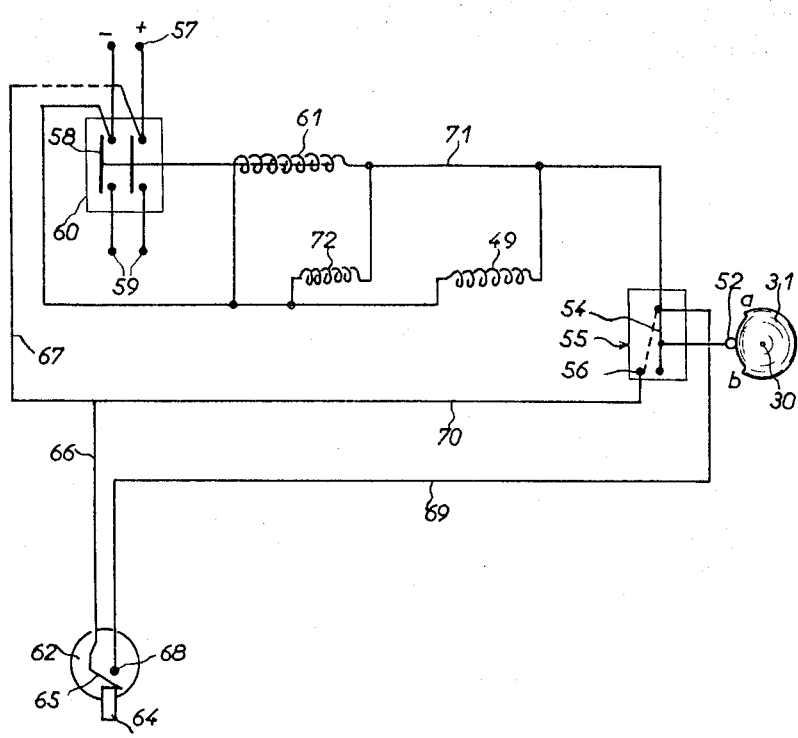

United States Patent Office 3,283,360
Patented Nov. 8, 1966

3,283,360
TENDERIZING MEAT MACHINES
Jean Pierre Tamain, Gentilly, Seine, France, assignor, by mesne assignments, to Jaccard Corporation, Buffalo, N.Y.
Filed June 16, 1964, Ser. No. 375,528
Claims priority, application France, June 21, 1963, 939,023
5 Claims. (Cl. 17—25)

This invention relates to a machine for tenderizing meat, of the type comprising an assembly of close fine metal blades which can be driven with a reciprocating movement with respect to a piece of meat placed on a support, so as to penetrate into the meat and to move away therefrom, the penetration having the effect of producing localized cuts which make the meat more tender.

The invention has for its object to provide improvements which will render the use of such a machine easier and more precise.

According to one such improvement, the electric motor which controls the reciprocating movement of the blades to insert them into the meat and then to withdraw them therefrom is combined with an automatic contactor which is actuated during the rotation of the motor or of a shaft driven by the latter and which automatically causes stopping of the motor when the blade assembly has returned to its initial position after completing a working cycle. Preferably, this arrangement is associated with a brake which is put into action as soon as the motor current is cut off, so that the motor and the blades are stopped in a precise position, but which brake is released electrically as soon as the motor receives current, in order to permit rotation of the said motor.

Other features of the invention will appear from the following description with reference to the accompanying drawings, given by way of example only, of one form of machine constructed according to the invention.

In the drawings:

FIGURE 1 is an elevational view, partly in section, of this form of improved machine according to the invention, FIGURE 2 is a partial sectional view showing on a larger scale part of the upper right-hand portion of FIGURE 1, FIGURES 3 and 4 are two half-elevational views corresponding to FIGURE 1 but showing with parts broken away the machine in two different working positions, FIGURE 5 is an elevational view in a direction at right angles to FIGURE 1, partly broken away, FIGURE 6 illustrates the continuation of the ascent of the blades, the commencement of their ascent being shown in FIGURE 4, FIGURE 7 is an end view of the blade block, showing the associated grids, FIGURE 8 shows separately one of the individual grids which are associated with the blades, FIGURE 9 is a diagram of the electrical connections serving to control the motor, the brake and other parts of the machine, and FIGURE 10 shows diagrammatically the arrangement of the brake.

Referring to the drawings, the machine shown comprises a fixed frame 1 equipped with feet 1a enabling it to be placed on a support, for example a table. The frame 1 carries at the top thereof a slab 2 on which the piece of meat 3 which is to be tenderized is placed, wood being advantageously used for forming the slab 2 so that the points of the blades shall not be damaged when they have passed through the piece of meat. The slab 2 is preferably removable so as to enable it to be cleaned and changed. For example, it can be mounted in dovetail slides 4.

At the top of the frame 1 and on either side of the slab 2 there are two tubular sleeves 5 serving to guide two vertical rods 6 which form opposite sides of a rectangular framework completed by a lower cross-piece or cross-head 7 and an upper cross-piece or cross-head 8. This framework is thus movable vertically with respect to the frame 1. It is urged into the upper position shown in FIGURE 1 by means of springs 9 attached on the one hand, to points beneath the frame of the machine and, on the other hand, to lugs 10 fixed to the lower cross-piece 7. Control of the lowering of the framework in order to move it from the position shown in FIGURES 1 and 5 into the position shown in FIGURES 3 and 4 is effected by means of a shaft 11 journalled in bearing 12 in the frame and actuated manually by a lever 13 fixed to the shaft. On the latter there is keyed a toothed wheel 14 of the type usually used for the purposes of chain transmission and to the periphery of which there is attached, at 15a, a length of chain 15, the other end 15b of which is fixed between the arms of a forked part 16 fast with the cross-piece 7. Rotation of the shaft 11 and of the wheel 14 in the direction of the arrow $f$ in FIGURE 5 thus causes the chain to be wound on the wheel and therefore a pull to be exerted on the part 16 and the cross-piece 7, the result of which is lowering of the framework constituted by the parts 6, 7, 8 in opposition to the springs 9. The upper position into which the framework is drawn upwardly by the springs 9, when the shaft 11 is released, is determined by the abutment of a lever 17 fast with the shaft 11 against a stop 18 rigid with the fixed frame 1.

On the rods 6 there is slidably mounted a cross-head 19 resting on two coil springs 20 which are disposed around the respective rods 6 and are masked by an assembly of telescopic sleeves or tubes 21.

This cross-head 19 carries a block 22 of vertically arranged blades. As will be seen from FIGURES 1, 2 and 7, this block is composed of thin parallel steel plates, one of which is designated by the reference 22a in FIGURE 7 and each of which is formed with cut-out blades 22b forming a kind of comb on each plate 22a. The plates 22a are assembled together by means of a rod 23 inserted in a hole in the plates and they are maintained at the appropriate interval of a few millimeters by spacers 22c (FIG. 2) which are likewise slipped on to the rod 23. The rod 23 is threaded at both its ends to permit the screwing in of an internal screw 23a which, by clamping the assembly of blades and spacers, holds them in the form of a block. This block is fixed to the bottom of the cross-head 19 by means of the dovetail shape of the plates 22a, as shown in FIGURE 7 at 24. This shape enables the blade block to be clamped between a fixed edge 25 provided at the base of the cross-head 19 and a removable edge-member 26 fixed to the cross-head 19 by means of screws 27. By removing the screws 27 and the edge-member 26, the blade block can be lifted out easily for cleaning it and freeing it of the particles of meat adhering thereto. It can also be replaced easily in the event of wear.

As will be seen in FIGURE 7, each of the blades 22b, which are of a substantially constant width from top to bottom, terminates at the bottom in an oblique cutting edge 28, the slope of which facilitates insertion into the meat. The slopes of these oblique cutting edges 28 are reversed as between each blade and the next, experience having shown that this arrangement facilitates penetration of the block of blades into the meat.

On the upper cross-piece 8 of the framework there is fixed an electric motor 29 designed to drive, by way of a train of gears 29a (only the outer casing of which is shown in FIGURE 5), the shaft 30 of a plate 31 likewise carried by the cross-piece 8. This plate is articulated at 32 to a connecting rod 32a the opposite end of which is articulated to the cross-head 19.

The blades 22 co-operate with a grid 33 formed, as will be seen in FIGURE 7, by parallel bars 34 the thickness of which is such that each of these bars engages in the gap between two successive plates 22a. This grid, with respect to which the blade plates 22a are shifted during their reciprocating movement, serves to preserve the flatness of the blades and also the gap between them. The grid 33 is removably mounted in a frame 35.

To this end, as will be seen in FIGURES 7 and 8, the bars 34 of the grid are gripped at one end 34a in a metal profile-member 34b which is advantageously provided with a handle 34c. When the grid is in position in the frame 35, the free ends 34d of the bars rest on a horizontal bearing surface 34e of the frame 35, while at their other ends, the profile-member 34b rests on the frame. This profile-member is provided with notches 34f permitting the passage therethrough and tightening of screws 34g with knurled heads which are screwed into the frame 35 to hold the grid. On the opposite side, plates 34h co-operate with screws 34i with knurled heads for the purpose of clamping the grid. It will be seen that it is sufficient to unscrew the screws 34g and 34i to be able to remove the grid by holding it by the handle 34c. When removed in this way the grid can easily be cleaned to free it from the particles of meat and blood which may adhere to it. The ends 34d of the bars are preferably chamfered to facilitate the engagement of the grid between the blade plates 22a when it is desired to replace it. The end 34a of each bar which is gripped in the profile 34b preferably has a cylindrical form so as to permit the bars to oscillate slightly in the profile 34b, thus facilitating the removal and the placing in position of the grid.

The frame 35 is supported by two rods 36. These rods extend through the cross-head 19, in which they can slide, and each terminates in a threaded end 37 screwed into a bush 38 (FIGURE 2). Each of these bushes 38, which permit the adjustment of the position of the frame 35 (by screwing each of them on to the corresponding threaded end 37 to a greater or lesser extent), passes through a hole in a cross-piece 39 and comprises a shouldered portion 40 which is interposed between the cross-head 19 and the cross-piece 39, forming a gap between these two elements. A nut 38a which is screwed on to each of the bushes above the cross-piece 39 immobilizes the bush in the cross-piece, the frame 35 being thus supported at a pre-determined and constant height below the cross-piece 39.

At each of its ends the latter terminates in a part 41 in the form of an eye which embraces the corresponding rod or column 6 and which is articulated to the cross-piece 39 by means of a pin 42 extending at right angles to the geometrical axis of the column 6. Around the column 6 the inner surface of the part 41 has a biconical form, which can be seen in FIGURE 2.

Mounted on the shaft 11 is a ratchet wheel 43 co-operating with a pawl 44 articulated at 45 to an arm 46 of the fixed frame of the machine. A torsion spring 47 acting on the pawl tends to disengage the tip 48 thereof from the teeth of the wheel 43. An electromagnet 49 has a movable armature 50 which bears on the pawl 44, so that energization of this electromagnet 49 depresses the pawl 44 in opposition to the spring 47 to engage the tip 48 thereof in the teeth of the wheel 43. These teeth are orientated in such manner that they lock the wheel 43 and the shaft 11 in opposition to the tension of the springs 9 when the shaft 11 is made to turn by means of the chain 15, as will be seen hereinafter in the explanation of the operation of the machine.

The plate 31, which is of generally circular shape, co-operates with a feeler constituted by a small lever 51 provided at its free end with a roller 52 co-operating with the periphery of the plate 31. The lever 51 is articulated on a pivot 53 and a spring (not shown) acts on it to keep the roller 52 in contact with the periphery of the plate 31. This periphery comprises an arc a–b (see also FIGURE 9), the radius of which is smaller than the radius of the remainder of the plate 31, the said arc a–b extending over an angle of about 30 to 50°. The lever 51 is connected to the movable part 54 of an electric contactor 55 (see FIGURE 9) in such manner that, at the moment when the plate 31 has an angular position such that the arc a–b is presented opposite the roller 52, the movable part 54 of the contactor 55 moves away from its make contact 56, as indicated in FIGURE 9, while in those angular positions of the plate 31 in which the roller 52 bears on the portion of larger radius of the periphery of this plate, the movable part 54 of the contactor comes into contact with the make contact, thus closing the circuit to which the contactor is connected.

The circuit shown in FIGURE 9 comprises the following: input terminals 57 for electric current, which has been assumed to be a direct current in order to facilitate explanation but the explanation naturally remains valid in the case of single-phase or polyphase alternating current; a main contactor 58 designed to supply current to the terminals 59 of the electric motor 29 and the movable part 60 of which is controlled by the armature of an electromagnet 61; and also a switch 62 arranged, with advantage, in the operating grip 63 of the lever 13. The button 64 which acts on the resilient movable element 65 of the said switch projects from this grip in a convenient position for actuation, for example by the thumb of the user holding the grip. Since the resilient element 65 of the switch is connected to the positive terminal 57 by the leads 66 and 67, the make contact 68 against which the said resilient element 65 bears when the button 64 is pressed is connected by the lead 69 to the movable part 54 of the contactor 55. The make contact 56 of this contactor is connected by the leads 70 and 67 to the positive terminal 57. The electromagnet 61 of the contactor 58, the electromagnet 49 associated with the pawl 44 and a third electromagnet 72 serving to control a brake and to which reference will be made hereinafter are connected in parallel between the movable part 54 of the contactor 55 and the negative terminal 57.

The machine operates in the following manner: when at rest, the machine is in the position which is shown in FIGURES 1 and 5, the roller 52 is on the arc a–b of the plate 31, the movable part 54 of the contactor 55 is therefore in the position shown in solid lines in FIGURE 9 and the resilient element 65 of the switch 62 is withdrawn by its own resilience from the contact 68. No electric current flows; the electromagnets 49, 61 and 72 are de-energized. The pawl 44 is therefore disengaged from the teeth of the wheel 43, as shown in FIGURE 5. The springs 9 hold the framework 6, 7, 8 in its upper position and the lever 17 fast with the shaft 11 is in abutment against the fixed stop 18. The pivot 32 of the connecting rod 32a is at its top or dead centre position. The cross-head 19 is in its upper position, as also is the cross-piece 39. The blades 22 are merely engaged by their points between the bars 34 of the grid carried by the frame 35 and the latter is at its maximum interval from the working table 2. The piece of meat 3 can therefore be placed on this table.

Then, taking the grip 63 of the lever 13, the latter is shifted angularly, carrying with it the shaft 11 with which it is fast, in the direction f shown in FIGURE 5, and in this way the framework 6, 7, 8 is lowered in opposition to the tension of the springs 9 by the action of the chain 15, which is wound on the wheel 14. The cross-head 19 follows the descending movement of the framework and thus compresses the springs 20, being pushed downwardly by the connecting rod 32a which is articulated at 32 to the plate 31, the shaft 30 of which latter is carried by the said framework. The lever 13 is stopped when the frame 35 comes into contact with the piece of meat, as shown in FIGURE 3. Still holding the grip 63, the button 64 is then pressed. The movable element 65 of the switch 62 thus bears on the contact 68 and this causes energization of the three electromagnets 61, 49 and 72 by closing the circuit by way of the positive terminal 57, leads 67 and 66, lead 69, lead 71 and return to the negative terminal 57. The energized electromagnet 61 shifts the movable part 60 of the contactor 58 and the motor 29 supplied from the terminals 59 is set in rotation, driving the plate 31 around its shaft 30. At the same time, energization of the electromagnet 72 releases the brake of the motor, as will be seen hereinafter. The electromagnet 49 moves its armature 50 downwardly and this causes the tip 48 of the pawl 44 to be engaged with the teeth of the ratchet wheel 43, so that the lever 13 can be released, this lever and the shaft 11 being locked by the cooperation of the pawl 44 and the wheel 43. The plate 31 having turned, the roller 52 will be presented to that portion of the periphery of this plate which is of larger radius, thus pacing the movable part 54 of the contactor 55 in the position shown in broken lines in FIGURE 9. This has the effect of maintaining the energization of the electromagnets 61, 72, 49 and the button 64 can therefore be released, the switch 62 being opened.

During its rotation, the plate 31 first moves the connecting rod 32a downwardly and this pushes the cross-head 19 downwardly (compressing the springs 20 still more) and at the same time the blade block 22 is moved downwardly while the frame 35 and the cross-piece 39 carrying it remain motionless, since the frame 35 is resting against the piece of meat. After a half revolution of the plate 31, the blades have penetrated fully into the piece of meat, as will be seen in FIGURE 4. During the following half-revolution of the plate 31, the connecting rod 32a ascends (FIGURE 6), drawing the cross-head 19 and the blades 22 upwardly. So that the blades 22b may become disengaged from the piece of meat during this part of the movement, it is necessary that the piece of meat be kept in place, failing which it would tend to follow the blades by clinging to them and thus rising with them. The piece of meat tends to push the frame 35 upwardly. This thrust is transmitted to the cross-piece 39 by the rods 36. The parts 41 articulated to this cross-piece at 42 therefore rock around their pivot 42, as will be seen in FIGURE 6, and this produces wedging of these parts on the rods or columns 6, thus locking the cross-piece 39 which then forms a stop for the frame 35. When the frame 35 is fixed in position in this way it clamps the piece of meat 3 and the blades 22b can then disengage themselves. At the moment when the plate 31 terminates its full revolution, the pivot 32 being located at the top as in FIGURES 1 and 3, the roller 52 is again presented to the arc a–b of small radius of the plate 31. It therefore brings the movable part 54 of the contactor 55 back again into the inoperative position shown in solid lines in FIGURE 9. The three electromagnets 61, 49, 72 are de-energized. Under the action of a spring (not shown), the movable part 60 of the contactor 58 returns to its inoperative position and the motor 29 is no longer supplied. The motor brake is placed in its operative position, producing immediate stopping of the motor. Finally, the armature 50 of the electromagnet 49 no longer bears on the pawl 44; thus it is sufficient to give the lever 13 a small movement in the direction of the arrow f for the pawl 44 to rise and become disengaged under the action of its return spring 47. The springs 9 then return the framework 6, 7, 8 to its upper position shown in FIGURE 1 and the piece of meat which has been treated can be removed.

FIGURE 10 shows the motor brake. This brake comprises a pulley 75, the rim of which has a trapezoidal cross-section and which is keyed on the shaft 76 of the motor 29. A length of belting 77, made of rubber, for example, and having a trapezoidal cross-section corresponding to that of the rim of the pulley 75, occupies a portion of the periphery of this pulley. At one of its ends 78, the belt 77 is attached by an angle iron 79 to a threaded rod 80 screwed into a fixed member 81 fast with the frame of the machine. The end 78 thus forms a fixed point, the position of which can be adjusted by screwing in or unscrewing the threaded rod 80 in the member 81. The other end of the belt is attached at 82 to one arm of a lever 83 which is adapted to pivot about a fixed pin 84 and the opposite arm of which is attached to a return spring 85 which applies a pull and is fastened to a fixed point at 86. The electromagnet 72 co-operates with an armature 87 pivoting about a fixed point 88. This armature carries a tail 89 which bears on a stop 90 on the lever 83. In the inoperative state, that is to say when the electromagnet 72 is not energized, the spring 85 pulls on the left-hand end of the lever 83 which, by pivoting about 84, shifts the end 82 of the belt 77 in the direction of the arrow $f_2$. By means of the threaded rod 80 adjustment of the belt is effected in such manner that at this moment the belt is fully engaged in the rim of the pulley 75, thus locking the shaft 76 of the motor. De-energization of the electromagnet 72 therefore ensures the immediate stopping of the motor at a suitable position of the arc a–b of the plate 31, that is to say when the pivot 32 of the connecting rod 32a is in its highest position (FIGURE 1).

On the other hand, as soon as the electromagnet 72 is energized, that is to say immediately the supply to the motor has commenced, the electromagnet attracts its armature 87 as has been seen, and in pivoting about the point 88, it displaces the end 82 of the belt 77 in the direction opposite to that of the arrow $f_2$, by the action of the tail 89. The belt is therefore moved away from the walls of the rim and the motor is free to turn.

It will be obvious that the embodiment described has been referred to only by way of example and that this embodiment could be modified, in particular by substituting equivalent technical means, without thereby departing from the scope of the invention as defined by the claims.

I claim:

1. A meat-tenderizing machine comprising, in combination, a support constructed for carrying a piece of meat to be tenderized, an assembly of closely-spaced thin parallel metal blades disposed opposite the support and constructed for reciprocating movement toward and away from the support from an initial fully-withdrawn position away from the support to a fully-extended position in which the blades will be in engagement with a piece of meat carried by the support, an electric motor drivingly connected with said assembly of blades for imparting thereto a reciprocating stroke with respect to said support for first engaging said blades in the piece of meat to be tenderized and then withdrawing the same therefrom, releasable brake means engageable with said motor for stopping said motor and the movement of the assembly of blades, said brake means being normally urged into braking engagement with said motor, electrically-actuated means for releasing said brake means upon energization of the motor, said brake re-engaging upon de-energization of said motor, an electric circuit for energizing said electric motor and said electrically-actuated releasing means, two switch means in parallel in said circuit, one a manually operated normally open switch means for initiating current flow to said electric circuit, the second a switch means associated with the position of said motor and assembly open only when said assembly is essentially in a fully withdrawn position, whereby when the manually operated switch is closed momentarily the resulting energization of said motor and release of said brake causes reciprocating movement of said assembly of blades, closing the second switch means and maintaining current to said motor until the reciprocating movement has returned said assembly of blades to the initial fully-withdrawn position and opened the second switch means, whereupon deenergization causes said brake means to engage said motor, halting same with said assembly back in the fully-withdrawn position.

2. A machine as defined in claim 1, wherein the brake means comprises a pulley driven by the motor and having a rim of trapezoidal cross-section, and a belt of corresponding trapezoidal cross-section adapted to engage frictionally the rim of said pulley, and wherein the means for engaging the brake means comprises resilient means positioned to keep said belt clamped on said rim.

3. A machine as defined in claim 1, wherein the second switch further comprises a rotary cam driven from the motor, and a cam-follower associated with said cam and with said switch for actuating the switch in response to the rotation of the cam, said cam being connected to undergo one revolution during one reciprocating stroke of the assembly of blades whereby to cause de-energization of the motor and stopping of said assembly after completion of one reciprocating stroke of said assembly.

4. A machine as defined in claim 1, further comprising means for adjusting the distance between the assembly of blades when at rest in its initial withdrawn position and the meat support, resilient means for urging apart said assembly and said support, ratchet means for locking said assembly at a given distance from said support against the action of said resilient means, and an electromagnet operatively associated with said ratchet means for keeping the same in locking condition when said electromagnet is energized and for releasing the same when said electromagnet is de-energized, said electromagnet being operatively associated with said electric circuit for energzing the motor and the brake releasing means, whereby it is controlled by said switch means.

5. A meat-tenderizing machine comprising, in combination, a support constructed for carrying a piece of meat to be tenderized, an assembly of closely-spaced thin parallel metal blades having cutting ends lying substantially in the same plane, said assambly being disposed opposite the support and constructed for reciprocating movement toward and away from the support from an initial fully-withdrawn position away from the support to a fully-extended position in which the blades will be in engagement with a piece of meat carried by the support, a grid comprising bars disposed in the gaps between the blades and in a parallel direction with respect to said plane, an electric motor drivingly connected with said assembly of blades for imparting thereto a reciprocating stroke with respect to said support and with respect to said grid for first engaging said blades in the piece of meat to be tenderized and then withdrawing the same therefrom to said initial position wherein said cutting ends are concealed in said grid, releasable brake means engageable with said motor for stopping said motor and the movement of the assembly of blades said brake means being normally urged into braking engagement with said motor, electrically-actuated means for releasing said brake means upon energization of said motor, said brake re-engaging upon de-energization of said motor, an electric circuit for energizing said electric motor and said electrically-actuated releasing means, two switch means parallel in said circuit, and actuating means operated during rotation, one a manually operated normally open switch means for initiating current flow to said electric circuit, the second a switch means associated with the position of said motor and assembly open only when said assembly is essentially in a fully withdrawn position, whereby when the manually operated switch is closed momentarily the resulting energization of said motor and release of said brake causes reciprocating movement of said assembly of blades, closing the second switch means and maintaining current to said motor until the reciprocating movement has returned said assembly of blades to the initial fully withdrawn position and opened the second switch means, whereupon de-energization causes said brake means to engage said motor, halting same with said assembly back in the fully withdrawn position with said cutting ends concealed in said grid after completion of a reciprocating stroke.

References Cited by the Examiner

UNITED STATES PATENTS

| 2,506,028 | 5/1950 | Letourneau | 318—275 X |
| 2,559,270 | 7/1951 | Abbott | 17—25 |

FOREIGN PATENTS

| 1,198,470 | 6/1959 | France. |
| 1,216,632 | 11/1959 | France. |

SAMUEL KOREN, *Primary Examiner.*

LUCIE H. LAUDENSLAGER, *Examiner.*